Dec. 21, 1943.   P. J. McANDREWS   2,337,057
PISTON ASSEMBLY
Original Filed Dec. 3, 1941
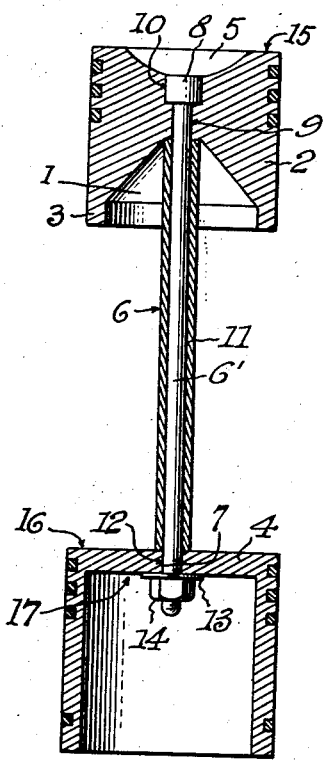
INVENTOR
PETER J. McANDREWS
BY
ATTORNEYS Patented Dec. 21, 1943

2,337,057

UNITED STATES PATENT OFFICE 2,337,057

PISTON ASSEMBLY

Peter J. McAndrews, Jamaica, N. Y.

Original application December 3, 1941, Serial No. 421,476. Divided and this application May 27, 1942, Serial No. 444,697

3 Claims. (Cl. 309—4)

(Granted under the act of March 3, 1883, as amended April 30, 1928; 370 O. G. 757)

The invention described herein may be manufactured and used by or for the Government for governmental purposes, without the payment of any royalty thereon to me.

This invention relates to an improved piston assembly, particularly adapted for use in prime movers such as shown in my copending application Serial No. 421,476, filed December 3, 1941, of which this application is a division.

It is an object of this invention to provide an improved piston rod the elements of which may be repaired or replaced without removing the primary piston from its cylinder.

It is a further object of my invention to provide an improved piston assembly for use in mechanisms where the compressor piston acts as a cross-head.

These and other objects and advantages of my invention will become apparent upon a consideration of the following detailed description and the accompanying drawing, in which the figure represents a view in cross-section of an embodiment of my invention.

Referring more specifically to the drawing, 6 designates generally a piston rod construction including a tie rod 6' and a sleeve 11. The tie rod 6' is threaded at one end 7 for engagement with a compression piston or cross-head 4 and has a head 8 on its other end, which head 8 is adapted to fit into a recess 10 formed in a piston 2.

The piston 2 is provided with a frusto-conical shaped cut-out portion 1 at its lower end 3 and has a central segmental spherical-shaped cut-out portion 5 in its upper end 15 to provide a small clearance between the top of the piston 2 and the head of the cylinder (not shown) in which the piston 2 is adapted to operate when the piston 2 is at top center in order to produce a high air turbulence and some swirl thereof for a purpose well known in the art. The recess 10 is centered in the upper end 15 and extends from the segmental spherical-shaped portion 5 toward the frusto-conical shaped cut-out portion 1 on the lower end 3. A hole 9 having a diameter substantially that of the tie rod 6' is axially centered in the piston 2 and extends from the recess 10 into the frusto-conical shaped cut-out portion 1. The upper end of the head 8 of the tie rod 6' is flush with the surface of the upper end 15 of the piston 2, thereby eliminating any obstruction in the clearance 5.

The head 16 of the piston 4 is provided with an axially centered hole 12 through which the threaded lower end 7 of the tie rod 6' extends and the sleeve 11 of the piston rod construction 6 is arranged between the pistons 2 and 4 to receive the tie rod. The upper end of the sleeve 11 engages the piston 2 at the inner end of the frusto-conical shaped cut-out portion 1 and the lower end of the sleeve abuts against the head 16 of the piston 4, whereby the sleeve 11 abutting against the adjacent faces of the pistons 2 and 4 provides a member for holding the dual pistons 2 and 4 in spaced relation with each other. In order to rigidly hold the dual pistons 2 and 4 and their connected parts in an assembled condition, a washer 13 and nut 14 are mounted on the lower threaded end 7 of the tie rod. The nut 14 is adapted to be screwed on the end 7 of the tie rod 6' for forcing the washer 13 into engagement with a remote face 17 of the piston 4.

The method of assembly is as follows:

The tie rod 6' is fed through the hole 9 of the piston 2 until the head 8 on the upper end of the tie rod engages in the recess 10. If desired, this may be a force fit. The sleeve 11 is then placed over tie rod 6' of the piston rod construction 6. This sleeve is made of sufficient length to properly position the piston 2 and the piston 4. The tie rod 6' is then fed through the hole 12 of the piston 4, washer 13 placed on the tie rod 6', and the whole assembly tightened by nut 14. With the head 8 of the tie rod 6' engaging in the recess 10 in the piston 2 and by tightening up on the nut 14, the dual pistons 2 and 4 are brought into alignment.

By means of my arrangement, it is possible to repair or replace the majority of the elements without removing the primary piston from its cylinder. Since the greatest amount of wear comes on the sleeve 11 and the piston 4, this feature represents a great saving in time when making such repairs or replacements.

While I have described my invention with reference to a single embodiment thereof, it is to be understood that I do not wish to be limited to the particular details and assemblies described, since obvious modifications within the spirit of the invention will suggest themselves to one skilled in the art.

Having described my invention, what I claim as new and wish to secure by Letters Patent is:

1. A device of the character described comprising dual pistons, a piston rod assembly holding said dual pistons in spaced relation and including a tie rod and a separable sleeve mounted on the tie rod, said sleeve engaging adjacent faces of said pistons, a recess formed in a remote face of one of said pistons, and means for placing said tie rod under tension and causing the adjacent faces of the pistons to place said sleeve under compression, said means including a locking device on one end of said tie rod and a head on the other end of said tie rod, said head engaging in said recess.

2. A device of the character described comprising dual pistons, a piston rod assembly holding said dual pistons in spaced relation and including a tie rod and a separable sleeve mounted on the tie rod, one of said pistons having a recess formed in a remote face thereof and a frusto-conical shaped cut-out portion formed in an adjacent face, one end of said sleeve removably engaging said first-mentioned piston at an inner end of the frusto-conical shaped cut-out portion and another end of said sleeve engaging an adjacent face of the other of said dual pistons and means for placing said tie rod under tension and causing the adjacent faces of said pistons to place said sleeve under compression, said means including a locking device mounted on one end of said tie rod and a head on the other end of said tie rod, said locking device engaging a remote face of one of said pistons and said head engaging said recess in the other of said pistons.

3. A device of the character described comprising dual pistons, a piston rod assembly holding said dual pistons in spaced relation and including a tie rod and a separable sleeve mounted on the tie rod, one of said pistons having a segmental spherical-shaped cut-out portion on a remote face thereof, a recess centered in said remote face and extending from the segmental spherical-shaped cut-out portion, a frusto-conical shaped cut-out portion formed in an adjacent face of said first-mentioned piston, an axially centered hole extending from said recess into said frusto-conical shaped portion, one end of said sleeve removably engaging said first-mentioned piston at an inner end of said frusto-conical shaped portion and another end of said sleeve removably engaging an adjacent face of the other of said dual pistons, and means for placing said tie rod under tension and causing the adjacent faces of said pistons to place said sleeve under compression, said means including a locking device on one end of said tie rod and a head on the other end of said tie rod, said locking device engaging the remote face of the other of said dual pistons and said head engaging said recess in said first-mentioned piston.

PETER J. McANDREWS.